United States Patent
Kollmeier et al.

(10) Patent No.: US 10,323,546 B2
(45) Date of Patent: Jun. 18, 2019

(54) METHOD FOR RECOVERING HEAT FROM INTERNAL COMBUSTION ENGINES AND FOR CONVERTING THE RECOVERED HEAT INTO MECHANICAL ENERGY

(71) Applicant: Fraunhofer-Gesellschaft zur Foerderung der angewandten Forschung e.V., Munich (DE)

(72) Inventors: Hans-Peter Kollmeier, Bruehl (DE); Ivica Kraljevic, Bad Rappenau (DE); Christian Rohrpasser, Bruchsal (DE); Helmut Striebich, Karlsruhe (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 120 days.

(21) Appl. No.: 15/311,214

(22) PCT Filed: May 18, 2015

(86) PCT No.: PCT/EP2015/001012
§ 371 (c)(1),
(2) Date: Nov. 15, 2016

(87) PCT Pub. No.: WO2015/176812
PCT Pub. Date: Nov. 26, 2015

(65) Prior Publication Data
US 2017/0081982 A1    Mar. 23, 2017

(30) Foreign Application Priority Data

May 19, 2014 (DE) .................. 10 2014 007 214

(51) Int. Cl.
*F01K 3/00* (2006.01)
*F01K 3/10* (2006.01)
(Continued)

(52) U.S. Cl.
CPC ............ *F01K 23/065* (2013.01); *F01K 3/002* (2013.01); *F01K 3/10* (2013.01); *F01K 3/14* (2013.01);
(Continued)

(58) Field of Classification Search
CPC .......... F01K 23/065; F01K 7/16; F01K 3/002; F01K 15/02; F01K 3/242; F01K 3/14;
(Continued)

(56) References Cited

U.S. PATENT DOCUMENTS

2010/0133031 A1 * 6/2010 Mendler .................. B60K 3/00
180/165
2010/0146949 A1 * 6/2010 Stobart .............. B60H 1/00492
60/300
(Continued)

FOREIGN PATENT DOCUMENTS

DE       102004052107 A1 *   5/2006  ......... B01D 53/9454
DE     10 2010 042 401          4/2012
(Continued)

*Primary Examiner* — J. Todd Newton
(74) *Attorney, Agent, or Firm* — Paul Vincent (57) ABSTRACT

A method and a device for recovering heat from an engine and for converting the heat into mechanical energy using an expansion machine. A heat accumulator fluid is guided in a primary circuit by means of a primary pump and is firstly heated by the waste heat of the combustion engine by means of a heat exchanger, is transferred into a heat accumulator and recirculated to the first heat exchanger, and, secondly, the heat accumulator fluid is guided in a secondary circuit by said heat accumulator fluid being extracted in the vapor state from the heat accumulator and being supplied to the expansion machine, and being condensed by means of a condenser downstream thereof and being recirculated into the heat accumulator by means of a secondary pump. The primary (Continued)

circuit of the heat accumulator fluid is connected to the secondary circuit exclusively via the heat accumulator.

25 Claims, 1 Drawing Sheet

(51) Int. Cl.
  *F01K 3/14*   (2006.01)
  *F01K 3/20*   (2006.01)
  *F01K 23/06*   (2006.01)
  *F01K 3/24*   (2006.01)
  *F01K 15/02*   (2006.01)
  *F01K 7/16*   (2006.01)
  *F02B 41/00*   (2006.01)
  *F02G 5/04*   (2006.01)

(52) U.S. Cl.
  CPC ............... *F01K 3/20* (2013.01); *F01K 3/242* (2013.01); *F01K 7/16* (2013.01); *F01K 15/02* (2013.01); *F02B 41/00* (2013.01); *F02G 5/04* (2013.01); *Y02T 10/16* (2013.01)

(58) Field of Classification Search
  CPC ... F01K 3/10; F02B 41/00; F02G 5/04; Y02T 10/16
  USPC .......................................................... 60/614
  See application file for complete search history.

(56) References Cited

U.S. PATENT DOCUMENTS

| | | | |
|---|---|---|---|
| 2010/0212304 A1 | 8/2010 | Hoetger | |
| 2011/0193346 A1* | 8/2011 | Guzman | F01K 15/02 290/52 |
| 2013/0037235 A1* | 2/2013 | Sakabe | F01N 5/02 165/41 |
| 2013/0192225 A1* | 8/2013 | Rewers | F01K 3/08 60/618 |
| 2013/0333380 A1* | 12/2013 | Kardos | B60W 30/188 60/605.1 |
| 2016/0333747 A1* | 11/2016 | KanFman | F01K 25/10 |
| 2017/0081982 A1* | 3/2017 | Kollmeier | F01K 3/002 |
| 2017/0350659 A1* | 12/2017 | Honda | B60K 6/12 |

FOREIGN PATENT DOCUMENTS

| | | | | |
|---|---|---|---|---|
| DE | 102011105709 A1 * | 12/2012 | | F01K 3/10 |
| JP | 03 018656 | 1/1991 | | |
| WO | WO 2008037980 A2 * | 4/2008 | | B60H 1/00492 |
| WO | WO 2012/074456 | 6/2012 | | |
| WO | WO 2014096892 A1 * | 6/2014 | | F01N 5/02 |

* cited by examiner

METHOD FOR RECOVERING HEAT FROM INTERNAL COMBUSTION ENGINES AND FOR CONVERTING THE RECOVERED HEAT INTO MECHANICAL ENERGY

This application is the national stage of PCT/EP2015/001012, filed May 18, 2015 and also claims Paris convention priority from DE 10 2014 007 214.2, filed May 19, 2014.

BACKGROUND OF THE INVENTION

The invention relates to a method for recovering heat from a combustion engine, in particular of a motor vehicle, and for converting the recovered heat into mechanical energy by means of an expansion machine, wherein a heat accumulator fluid which is guided in a primary circuit by means of at least one primary pump is heated by the waste heat of the combustion engine by means of at least one first heat exchanger, is transferred into a heat accumulator and recirculated to the at least one first heat exchanger, and wherein the heat accumulator fluid is furthermore guided in a secondary circuit by said heat accumulator fluid being extracted in the vapor state from the heat accumulator and being supplied to the expansion machine, and being condensed by means of a condenser downstream of the expansion machine and being recirculated into the heat accumulator by means of at least one secondary pump. The invention furthermore relates to a device, which is suitable in particular for carrying out such a method, for recovering heat from a combustion engine, in particular of a motor vehicle, and for converting the recovered heat into mechanical energy by means of an expansion machine, with a primary circuit of a heat accumulator fluid, which primary circuit comprises at least one first heat exchanger which is heated by the waste heat of a waste heat flow from the combustion engine, a heat accumulator and a first annular line, connecting the first heat exchanger to the heat accumulator, with at least one primary pump, and with a secondary circuit of the heat accumulator fluid, which secondary circuit is connected to the primary circuit and comprises the expansion machine, a condenser arranged downstream thereof and a second annular line with at least one secondary pump.

Methods for recovering the waste heat from combustion engines in the manner of the Clausius-Rankine cycle are substantially known. They are used, for example, in large ship engines and stationary engines in order to improve the economy and the environmental friendliness thereof through the energy saving achieved therewith. Furthermore, the use of cycles of this type in lorry engines has been tested, wherein a fuel saving of up to approximately 15% was able to be obtained (Rainer Lutz, Peter Geskes, Eberhard Pantow, Jochen Eitel: "Nutzung der Abgasenergie von Nutzfahrzeugen mit dem Rankine-Prozess [Use of the Exhaust Gas Energy from Commercial Vehicles using the Rankine Cycle]", MTZ October 2012). However, firstly the high technical and structural outlay with regard to the evaporator and condenser used for the heat accumulator fluid in the cycle and, secondly, the complicated control and regulating technology have proven disadvantageous here, and therefore this technology has been unable to be realized in practice to date. Furthermore, the technology known with regard to lorry engines is transferable at best to a limited extent to engines of passenger vehicles because, in contrast to lorries, passenger vehicles are generally operated with very different and frequently changing engine powers, and therefore the useable waste heat from the internal combustion engine greatly varies, wherein such unsteady heat flows are scarcely controllable by regulation technology for realizing the abovementioned Rankine cycles according to the prior art. Also, the achievable efficiencies are very low in the case of a forced continuous operation of such a Rankine cycle. In the meantime, there is a requirement both for economic and for ecological reasons to ensure a saving on fuel even in the case of passenger vehicles (for example in town traffic where there is maximum fuel consumption because of the frequent load changes) by using the waste heat from the internal combustion engine (Dr. Raymond Freymann: "Der Turbostreamer der zweiten Generation [The Second Generation Turbostream]", MTZ February 2012).

DE 10 2011 105 709 A1 describes a method of the type in question and a device for recovering heat from an internal combustion engine of a motor vehicle, and for converting the recovered heat into mechanical energy by means of an expansion machine, by a heat accumulator fluid which is guided in a working or secondary circuit being evaporated by means of a heat exchanger, which is fed from the waste heat of the engine and is in the form of an evaporator, and the vapor which is produced is supplied to an expansion machine which is coupled to the engine and converts the thermal energy into mechanical energy. The exhaust steam is condensed by means of a condenser downstream of the expansion machine, is evaporated by means of the evaporator and supplied again to the expansion machine. In order to ensure improved efficiency of the drive system even in the event of an unsteady operation of the internal combustion engine with varying waste heat flows, the document makes provision for the working or secondary circuit to be connected via a multi-way valve to a primary circuit of the heat accumulator fluid, which primary circuit comprises a steam accumulator for the heat accumulator fluid evaporated by means of the evaporator, and therefore, in the event of a driving power of the expansion machine temporarily not being required, the heat accumulator fluid in the vapor state can firstly be temporarily stored and secondly can be extracted as required and output to the expansion machine if an increased power is intended to be provided.

A disadvantage firstly consists in that the thermal energy which can be stored by means of the steam accumulator has proven relatively small if the steam accumulator does not have a very large capacity which takes up the available loading compartment of the motor vehicle and, in addition, also causes a considerable additional weight in respect of the necessary thermal insulation of the steam accumulator, said additional weight resulting in turn in increased fuel consumption. Consequently, the steam stored in the steam accumulator is firstly capable of bridging only short load phases of the engine when said steam is supplied to the expansion machine and secondly, in phases of a theoretical excess of available waste heat from the internal combustion engine, only a small part thereof can be stored in the steam accumulator. Furthermore, the integration, which is proposed in DE 10 2011 105 709 A1, of the evaporator in the working or secondary circuit (i.e. the heat accumulator fluid evaporated by means of the evaporator is supplied directly to the expansion machine during normal operation) requires in particular a considerable outlay on control and regulating technology since the quantity of heat accumulator fluid to be evaporated always has to be adapted to the specifically available waste heat flow from the combustion engine. Furthermore, the control and regulating technology has to take account here of a multiplicity of operating states, in dependence on which the primary and secondary circuits of the heat accumulator fluid have to be diverted in various ways by means of the multi-way valve.

JP H03-018656 A concerns a further method for recovering the heat from internal combustion engines of motor vehicles, wherein the recovered heat is converted into mechanical energy by means of an expansion machine. In this case, a heat accumulator fluid which is circulated by means of a pump is heated by the waste heat of the internal combustion engine by means of a heat exchanger of the cooling water circuit, is transferred into a type of heat accumulator and recirculated to the heat exchanger of the cooling water circuit. Furthermore, it is provided that a partial flow of the heat accumulator fluid is guided in a branch circuit by said partial flow being extracted in the vapor state from the heat accumulator and being supplied to a low load stage of the expansion machine, being condensed by means of a condenser downstream of the expansion machine and being recirculated into the heat accumulator by means of a further pump. Alternatively, the heat accumulator fluid is extracted in the liquid phase from the heat accumulator, is evaporated by means of an exhaust gas heat exchanger and supplied directly to a high power stage of the expansion machine.

WO 2012/074456 A1 likewise describes a method and a device for recovering heat from internal combustion engines of motor vehicles and for converting the recovered heat into mechanical energy by means of an expansion machine, wherein a heat accumulator medium in the form of a zeotropic coolant mixture is guided in a plurality of circuits with a separator. In a first circuit, the coolant mixture is evaporated in an evaporator, which is operated with waste heat from the engine, and is transferred into the separator from where the vapor phase of the low-boiling coolant component is supplied to the expansion machine via an additional heater and is recirculated via a heat exchanger and a condenser. In a second circuit, the liquid phase of the high-boiling coolant component is extracted from the separator and—in turn via the heat exchanger and the condenser—transferred to the evaporator from where said coolant component can pass via the additional heater to the expansion machine or back into the separator.

Apart from the fact that firstly the heat accumulator according to JP H03-018656 A cited above is capable of storing only a very small portion of the available heat (namely only the heat which is extracted from the cooling water circuit via the heat exchanger of the coolant circuit and serves merely for operating the expansion machine in the low power stage by means of the heat accumulator medium removed from the gas phase of the heat accumulator, while the exhaust gas heat exchanger is arranged directly upstream of the expansion machine), secondly the separator according to previously cited WO 2012/074456 A1—if it serves at all (also) as a "heat accumulator"—can likewise store only a very small portion of the available heat (namely exclusively for a low load state in which the gaseous phase of the low boiling coolant component is extracted from the gas chamber of the separator and supplied via a valve and the additional heater to the expansion machine whereas, in a high-load state, only cold liquid coolant is extracted from the separator via a further valve in order to heat said coolant only by means of the heat exchanger and the evaporator), in both known methods in particular the very high outlay on control and regulation which has to conform with the respective operating states in turn proves disadvantageous, wherein the heat which generally arises in a highly unsteady manner in combustion engines cannot be effectively stored for the abovementioned reasons.

The invention is therefore based on the object of developing a method and a device for recovering heat from a combustion engine, in particular of a motor vehicle, and for converting the recovered heat into mechanical energy by means of an expansion machine of the type mentioned at the beginning, in a simple and cost-effective manner to the effect that the abovementioned disadvantages can be at least partially countered.

SUMMARY OF THE INVENTION

In respect of a method, this object is achieved according to the invention in the case of a method of the type mentioned at the beginning in that the primary circuit of the heat accumulator fluid is connected to the secondary circuit exclusively via the heat accumulator and is otherwise separated from said secondary circuit.

In respect of a device, in order to achieve this object the invention furthermore makes provision, in the case of a device of the type mentioned at the beginning, that the primary circuit of the heat accumulator fluid is connected to the secondary circuit exclusively via the heat accumulator and is otherwise separated from said secondary circuit.

The embodiment according to the invention consequently makes provision for the primary circuit of the heat accumulator fluid, which primary circuit serves for "supercharging" the heat accumulator, to be completely separate during the operation from the secondary circuit of the heat accumulator fluid, which secondary circuit serves for driving the expansion machine, and for the two circuits to be connected to each other exclusively via the heat accumulator, and for the latter consequently to form the single intersection between the primary and the secondary circuit. Owing to this separation according to the invention of the circuits from each other, the expansion machine can always be fed during the operation with the heat accumulator fluid, which is removed from the gas chamber of the heat accumulator, in the secondary circuit, while at least most of the supply of energy to the heat accumulator takes place independently therefrom via the primary circuit after the waste heat of the combustion engine has been fed to the heat accumulator fluid in the first heat exchanger.

Consequently, the waste heat flow, which frequently arises in an unsteady manner, of the combustion engine can be used continuously and independently of its current heat quantity in the best possible way for "supercharging" the heat accumulator without the operation of the expansion machine via the secondary circuit being influenced, and without an adaptation of an evaporator that is complicated in terms of control and/or regulation technology being required, as is the case in the prior art mentioned at the beginning; accordingly, at least some of the heat accumulator fluid is always evaporated in a heat exchanger designed as an evaporator and is supplied directly to the expansion machine, in particular whenever the latter is intended to be operated at high power. Secondly, according to the invention, virtually steady steam states of the heat accumulator medium from the heat accumulator can be provided to the expansion machine via the secondary circuit of the heat accumulator fluid since operation of the expansion machine in its optimum design range can always be permitted without a complicated regulation which is dependent on the respective waste heat flow and consequently on the respective operating state of the combustion engine being required.

In an advantageous embodiment of the method according to the invention, it can be provided that the heat accumulator fluid in the heat accumulator is kept at least predominantly in the liquid state, and therefore the predominant portion of the heat stored in the heat accumulator is stored in the heat accumulator fluid present in the liquid state in the heat accumulator. In respect of a device, it can be provided for this purpose that the heat accumulator is designed as a pressure container, the internal pressure of which can be controlled and/or regulated by means of at least one pressure control and/or regulating valve arranged in the secondary circuit downstream of said heat accumulator; and/or by means of the pressure-controllable and/or regulable secondary pump arranged in the secondary circuit; and/or by means of a pressure control and/or regulation of the expansion machine, which controls and/or regulates the pressure decrease in the heat accumulator fluid passing therethrough.

Such an embodiment, according to which the heat accumulator fluid which is stored in the heat accumulator and serves as the working medium, for example a heat accumulator fluid on the basis of water, an alcohol, such as ethanol, n- and/or iso-propanol, etc., a halogenated hydrocarbon or the like, present primarily in the liquid state, consequently provides operation of the heat accumulator in the manner of what is referred to as a Ruths accumulator, in which, above the liquid level of the heat accumulator fluid, there is a steam phase thereof which can be supplied to the expansion machine. Accordingly, if heat accumulator fluid in the vapor state is extracted from the heat accumulator via the gas chamber and fed into the expansion machine via the secondary circuit, a re-evaporation of its main portion which is in the liquid phase (with regard to its overall mass of liquid and gaseous phase) arises, wherein the heat required for the re-evaporation is extracted from the liquid phase. Consequently, the pressure and the temperature in the heat accumulator drop, which is compensated for by the supply of fresh heat accumulator fluid, which is heated by means of the first heat exchanger, from the primary circuit which is separate from the secondary circuit. Since the quantity of steam which can be extracted in this manner from the heat accumulator is considerably greater than in a conventional steam accumulator because of the significantly increased volumetric energy density of the liquid heat accumulator medium, the heat accumulator, with a very small volume by contrast, is capable of storing a quantity of heat which is significantly larger, for example approximately by the factor of 15, and can make said quantity of heat available as required in order to bridge even long-lasting load phases and optionally in particular also to ensure a temporary operation of the motor vehicle, with the internal combustion engine switched off, purely by means of the mechanical energy which is produced by the expansion machine and which in turn results exclusively by conversion of the thermal energy of the heat accumulator medium stored in the heat accumulator. In conjunction with the exclusive connection of the primary circuit to the secondary circuit by means of the heat exchanger during the operation, an extraction of heat accumulator fluid in the vapor state from the heat-accumulator gas chamber arranged above the liquid level, said extraction being requirement-oriented in terms of time and quantity, i.e. adapted to the respective load state of the internal combustion engine, can be ensured for the driving of the expansion machine, and therefore the latter can be operated very substantially independently of the waste heat flow, which frequently arises in an unsteady manner, of the internal combustion engine, wherein the expansion machine can thereby be fed with a virtually steady flow of steam from the heat accumulator fluid from the heat accumulator in order always to permit operation of said expansion machine in its optimum design range. Consequently, the heat accumulator is capable of serving as a type of "buffer" which can always compensate for the fluctuations in the quantity of heat in the unsteady waste heat flow (from the primary circuit) by liquid heat accumulator fluid being evaporated or gaseous heat accumulator fluid being condensed, wherein, nevertheless, a gaseous heat accumulator fluid which is more or less in equilibrium with the liquid phase is always available in the gas chamber of the heat accumulator and can be transferred to the expansion machine. Owing to the structural embodiment of the heat accumulator as a pressure container with a pressure control and/or regulating valve arranged downstream thereof, a pressure-controllable and/or regulable secondary pump arranged in the secondary circuit, and/or a pressure control and/or regulation of the expansion machine, which controls and/or regulates the pressure decrease in the heat accumulator fluid passing therethrough and in particular is capable of limiting the maximum pressure decrease in the heat accumulator fluid downstream of the expansion machine in comparison to upstream thereof, the pressure required at the respective temperature of the heat accumulator fluid stored in the heat accumulator can always be set in the latter since said heat accumulator fluid is at least predominantly present in the liquid or condensed phase.

Accordingly, it can be provided in an advantageous embodiment of the method according to the invention, that the heat accumulator fluid in the heat accumulator is kept at least predominantly in the liquid state by the heat accumulator being kept by means of at least one pressure control and/or regulating valve arranged in the secondary circuit downstream of said heat accumulator; and/or by means of the pressure-controllable and/or—regulable secondary pump arranged in the secondary circuit; and/or by means of a pressure control and/or regulation of the expansion machine which controls and/or regulates the pressure decrease in the heat accumulator fluid passing therethrough, to a pressure at which the predominant portion of the heat accumulator fluid located in the heat accumulator is present in the liquid state.

In a further advantageous embodiment of the method according to the invention, it can be provided in this connection that the heat accumulator fluid in the heat accumulator, at the respective temperature prevailing in the heat accumulator, is kept substantially in subcritical thermodynamic equilibrium between its liquid state and its vapor state in accordance with one of the isobars between the saturated liquid curve (lower boundary curve) and the saturated vapor curve (upper boundary curve) in its temperature-entropy diagram (T,s diagram). Owing to the fact that the heat accumulator fluid located in the heat accumulator is preferably within the range of its thermodynamic equilibrium (i.e. the liquid phase forming its main portion in terms of mass is substantially in a state on the saturated liquid curve or on the lower (left) boundary curve of the T,s diagram, while its steam phase which is in equilibrium with the liquid phase is located on the saturated vapor curve or on the upper (right) boundary curve of the T,s diagram), given a high volumetric energy density of the heat accumulator medium, the effect is achieved that, when the heat accumulator fluid in vapor form is extracted from the energy accumulator in order to be supplied to the expansion machine in the secondary circuit, the partial pressure of the heat accumulator fluid in the energy accumulator is lowered, as a result of which the heat accumulator fluid, which is primarily present there in the liquid phase, is re-evaporated, with a decrease in its internal energy (pressure and temperature drop) such that said heat accumulator fluid is continuously available, in particular in the form of saturated steam, even if precisely no heat accumulator fluid with a quantity of heat sufficient for compensating for the internal energy loss can be supplied to the heat accumulator via the primary circuit because of the lack of a sufficient waste heat flow from the combustion engine. The heat which is supplied to the heat accumulator by the heat accumulator fluid guided in the primary circuit and which is transferred to said heat accumulator via the at least one first heat exchanger operating in the manner of a "flow heater" leads here in particular to increasing the heat energy content of the heat accumulator fluid in the liquid or condensed state, wherein the heat accumulator fluid, after passing through the first heat exchanger, can be present in a liquid or partially or entirely evaporated form, depending on the temporarily present provision of waste heat from the combustion engine, wherein, in the last-mentioned state, said heat accumulator liquid is at least largely condensed upon (re)entry into the heat accumulator as a consequence of the pressure set there in order to be able to keep the heat accumulator fluid for storage in the primarily liquid state in the heat accumulator and to be able to re-evaporate same over a long period of time into the gas chamber of the heat accumulator in order to feed said heat accumulator fluid into the expansion machine via the secondary circuit. In addition, in the event of operation of the heat accumulator in the boiling range of the heat accumulator fluid, the advantage is afforded of better heat transmission and therefore of improved incorporation of the waste heat flow of the combustion engine into the heat accumulator fluid circulated in the circuit, wherein the at least one first heat exchanger does not have to have the function of an evaporator even though the heat accumulator fluid, in particular in the case of a very high waste heat flow which is available, can, of course, also be at least partially evaporated in the first heat exchanger, after which said heat accumulator fluid is condensed again upon entry into the heat accumulator as a result of the pressure control and/or pressure regulation thereof—whether via the expansion machine or whether in particular via the pressure control and/or regulating valve in the secondary circuit downstream of the heat accumulator and/or via the secondary pump in the secondary circuit upstream of the heat accumulator.

As already indicated, the separation according to the invention of the primary circuit from the secondary circuit of the heat accumulator fluid makes it possible in particular that the expansion machine is fed exclusively with the heat accumulator fluid in the vapor state from the heat accumulator. Accordingly, it can preferably be provided, with respect to the device, that the expansion machine arranged in the secondary circuit is connected to the heat accumulator exclusively by means of the second annular line. Consequently, the expansion machine is always fed during the operation exclusively with the heat accumulator fluid, which is in vapor form and is removed from the gas chamber of the heat accumulator, in the secondary circuit, while the energy supply to the heat accumulator takes place primarily (but preferably not exclusively, as is explained in more detail further below) via the primary circuit after waste heat from the combustion engine has been supplied to the heat accumulator fluid in the at least one first heat exchanger.

In order to be able to use the waste heat from the combustion engine in the best possible manner and to be able to cool the heat accumulator fluid to not too low a temperature even in the secondary circuit prior to its return into the heat accumulator, the heat accumulator fluid is preferably also heated in the secondary circuit downstream of the condenser by the waste heat of the combustion engine by means of at least one heat exchanger before said heat accumulator fluid is recirculated into the heat accumulator. In respect of the device, it can preferably be provided for this purpose that the secondary circuit comprises at least one second heat exchanger which is heated by the waste heat from the combustion engine and is arranged downstream of the condenser, wherein the at least one second heat exchanger is arranged in particular in a residual heat flow of the combustion engine downstream of the at least one first heat exchanger. Consequently, even at relatively low temperatures of the waste heat flow from the combustion engine, virtually the entire amount of recoverable residual heat can be extracted from the waste heat flow in order to preheat the heat accumulator fluid in the secondary circuit before said heat accumulator fluid passes into the heat accumulator.

While the heat accumulator fluid in the secondary circuit can basically also be heated by means of the at least one first heat exchanger which in this case comprises, for example, three heat exchange lines (such as firstly for the exhaust gas flow and secondly for the primary circuit and the secondary circuit, which is separated therefrom, of the heat accumulator fluid), the heat accumulator fluid in the secondary circuit—as indicated above—can be heated in a preferred embodiment by means of at least one second heat exchanger which is operated in particular by the residual heat of the combustion engine after the waste heat of the latter has been supplied by means of the at least one first heat exchanger to the heat accumulator fluid guided in the primary circuit. In this manner, the greatest possible quantity of heat can be extracted from the waste heat flow from the combustion engine without considerable losses occurring as per the conventional flow evaporators according to the prior art. This is noticeable positively with regard to optimum efficiency especially at relatively low exhaust gas temperatures, as are frequently present specifically in the case of combustion engines of motor vehicles.

The condenser positioned in the secondary circuit can be supplied, for example, with ambient air, with a cooling medium of the combustion engine or with another cooling medium circuit of a motor vehicle in order to condense the heat accumulator fluid in the secondary circuit downstream of the expansion machine.

In an advantageous embodiment, it can be provided in this connection that the condenser is supplied with a cooling medium, in particular from the combustion engine, wherein the cooling medium is heated as required, in particular during heating-up phases of the combustion engine, by the heat accumulator fluid. The removal of heat in the condenser can take place, for example, via the cooling circuit of the combustion engine or via other suitable cooling circuits of the motor vehicle or else directly into the ambient air. As soon as the condenser is integrated in the cooling circuit of the combustion engine and is supplied with the cooling medium of the combustion engine, in particular the cold starting behaviour of the combustion engine can consequently be improved and its hot running phase shortened by the cooling medium being preheated by the (residual) heat of the heat accumulator medium which is stored in the heat accumulator and is guided in the secondary circuit. The heating-up phases of the combustion engine can therefore be effectively shortened for as long as (residual) heat is still available in the heat accumulator.

In this connection, it can be provided, according to an advantageous development, that for the heating of the cooling medium as required, the heat accumulator medium in the secondary circuit is supplied directly to the condenser past the expansion machine via a bypass line. With respect to the device, the secondary circuit for this purpose can have a bypass line which is equipped with a shut-off valve, in particular in the form of a pressure control and/or regulating valve, and which bypasses the expansion machine and directly connects the heat accumulator via the second annular line to the condenser as required. In this manner, the heat accumulator fluid can be supplied in its secondary circuit past the expansion machine and directly to the condenser where it transmits its heat, by being condensed, to the cooling medium, for example of the combustion engine, in order to bring the cooling medium rapidly to its operating temperature. In the meantime, it is, of course, also conceivable for such a preheating of the cooling medium to be carried out by means of the condenser by the heat accumulator medium which is guided in the secondary circuit and has already passed through the expansion machine (i.e. after a certain loss of temperature associated with the expansion) without circumventing or bypassing said expansion machine.

In a further advantageous embodiment of the method according to the invention, it can be provided that the condensed heat accumulator fluid in the secondary circuit downstream of the condenser is temporarily stored in a buffer container from which said heat accumulator fluid is recirculated into the heat accumulator by means of the secondary pump. In respect of the device, for this purpose, the secondary circuit can have a buffer container, which is arranged downstream of the condenser and more expediently upstream of the preferably provided second heat exchanger, for the heat accumulator fluid. It is thereby possible to temporarily store the heat accumulator fluid, which is guided in the secondary circuit, downstream of the condenser and to recirculate said heat accumulator fluid in the heat accumulator depending on the temporarily available waste heat flow from the combustion engine and the thermodynamic state of the heat accumulator fluid in the heat accumulator.

According to an advantageous development of the method according to the invention, it can be provided that the at least one first heat exchanger and/or the at least one second heat exchanger are/is decoupled from the waste heat or residual heat of the combustion engine when
  the heat accumulator at a maximum temperature has reached its maximum pressure; and/or
  the heat accumulator has reached its maximum filling quantity with the heat accumulator fluid; and/or
  the heat accumulator fluid circulated in the secondary circuit can no longer be condensed in the condenser as a result of the heat removed there.

In respect of the device, it can preferably be provided for this purpose that the waste heat flow or residual heat flow of the combustion engine can be separated by means of a branch provided with a valve
  from the at least one first heat exchanger and/or
  from the at least one second heat exchanger
in order to bypass the first heat exchanger and/or the second heat exchanger as required.

In this manner, a (local) superheating of the heat accumulator fluid and of the components of its primary and secondary circuit can be reliably prevented by the waste heat flow or residual heat flow from the combustion engine being guided past the first and/or second heat exchanger.

Furthermore, it can be provided, according to a development of the method according to the invention, that the heat accumulator fluid fed in the vapor state from the heat accumulator into the secondary circuit is superheated as required upstream of the expansion machine, wherein the heat accumulator fluid is superheated as required in particular
  by means of at least one third heat exchanger which is fed with a waste heat flow from the combustion engine as required, or
  by means of a burner which is connected in particular to the fuel supply of the combustion engine.

In respect of the device, it may be appropriate for this purpose that the secondary circuit downstream of the heat accumulator and upstream of the expansion machine has
  a third heat exchanger which is connectable to a waste heat flow of the combustion engine as required, or
  a burner which is connected in particular to the fuel supply of the combustion engine.

In this manner, during the operation, for example if a particularly high power of the motor vehicle is temporarily desirable (for example because of a high acceleration), the steam of the heat accumulator fluid that is extracted from the heat accumulator, from the gas phase thereof, can be superheated, as a result of which the power of the expansion machine can be increased, and therefore the (increased) mechanical energy produced by said expansion machine can be used for such an operating state.

The first heat exchanger and/or the second heat exchanger and optionally the third heat exchanger can furthermore expediently be fed by an exhaust gas flow from the combustion engine. An exhaust pipe guiding the exhaust gas flow should expediently be thermally insulated here, which, of course, also applies to the other components of the primary and secondary circuit of the heat accumulator medium and in particular to the heat accumulator itself which should be configured to be as adiabatic as possible and so as to have good heat insulation in order to minimize the heat losses to the surroundings. The heat accumulator can be, for example, of multi-walled design here and can have vacuum insulation and/or can be equipped with material which is capable of latent heat accumulation, and therefore the heat of the heat accumulator fluid can also be stored for one or more days without significant dissipation into the surroundings. Such thermal insulation of the heat accumulator therefore preferably has a multi-layered wall, in the intermediate space of which a negative pressure or vacuum prevails or an aerogel or a thermochemical storage medium is accommodated.

Furthermore, for the reasons mentioned further above in respect of a high energy density of the heat accumulator fluid stored in the heat accumulator, it may be appropriate for the quantity of heat accumulator fluid circulated in the primary circuit and in the secondary circuit separate therefrom to be selected in such a manner that, at least at a maximum possible filling level of the heat accumulator fluid in the heat accumulator (the heat accumulator is entirely "supercharged"), at least 50%, in particular at least 70%, preferably at least 90%, of the volume available in the heat accumulator are filled with heat accumulator fluid which is in the liquid state, while the remaining volume of the heat accumulator is filled with heat accumulator fluid which is in the gas phase and is under a corresponding pressure.

Finally, it can be provided, in an advantageous embodiment of the method according to the invention, that

- at least some of the mechanical energy obtained by means of the expansion machine, is output, in particular with the interconnection of a gearbox, to the drive train of the motor vehicle; and/or
- at least some of the mechanical energy obtained by means of the expansion machine is output to a power generator which is arranged downstream of the expansion machine and the power thereof which is generated therefrom is fed into the power supply of the motor vehicle.

Accordingly, in respect of the device, it can preferably be provided that
- the expansion machine is connected, in particular with the interconnection of a gearbox, to the drive train of the motor vehicle, and/or
- the expansion machine is connected to a power generator which is arranged downstream thereof and is connected to the power supply of the motor vehicle.

Consequently, the mechanical energy produced from the waste heat of the combustion engine by the expansion machine can be used firstly directly for driving the motor vehicle, whether for boosting the internal combustion engine or whether alternatively when the latter is at a standstill. Secondly, the mechanical energy obtained from the waste heat can be used for generating power in order to charge in particular the traction batteries (and of course optionally also the "normal" battery of the customary electrical system of a motor vehicle) of hybrid vehicles having an electric drive.

Further features and advantages of the invention emerge from the description below of an exemplary embodiment with reference to the drawing.

DESCRIPTION OF THE PREFERRED EMBODIMENT

Figure 1:
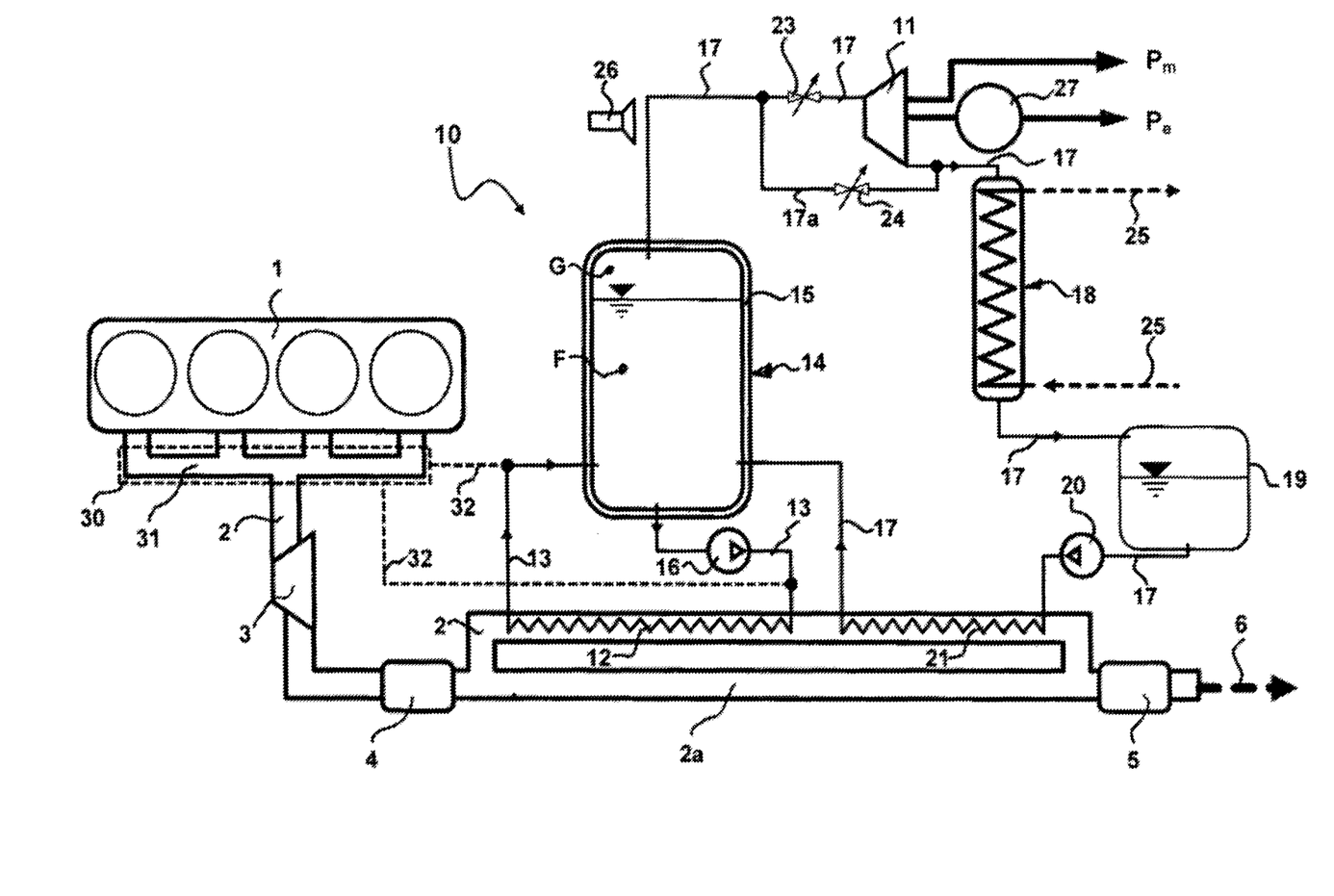
The single FIGURE shows a schematic flow diagram of an embodiment of a device according to the invention for recovering heat from the internal combustion engine of a motor vehicle and for converting the recovered heat into mechanical energy by means of an expansion machine including the internal combustion engine and the waste heat flow removed therefrom.

The drawing reproduces, in a schematic illustration, an internal combustion engine 1 of a motor vehicle (otherwise not shown), for example a passenger vehicle or a lorry, which has an exhaust pipe 2 in which the exhaust gas flow serving as the waste heat flow is removed from the internal combustion engine 1. The exhaust pipe 2 leads, for example, into a turbocharger 3 and into a catalytic convertor 4, which is arranged downstream of the latter, for the catalytic purification of the exhaust gas, and the exhaust gas flow downstream of the latter passes through an end silencer 5 and is removed into the surroundings via an exhaust 6.

A device, which is provided overall with the reference sign 10, for recovering heat from the internal combustion engine 1 and for converting the recovered heat into mechanical energy by means of an expansion machine 11 designed, for example, in the manner of a turbomachine or positive displacement machine, contains a heat accumulator fluid, for example water, alcohol, solutions thereof or the like, which is guided in a primary circuit and serves as the working medium, wherein the primary circuit comprises a first heat exchanger 12 which is heated by the waste heat of the waste heat flow, which is guided in the exhaust pipe 2, from the internal combustion engine 1. A first annular line 13 of the primary circuit connects the downstream end of the first heat exchanger 12 to a heat accumulator 14 in order to transfer the heat accumulator fluid heated by means of the exhaust heat flow into the heat accumulator 14. The heat accumulator 14 is formed by a pressure container, for example with a capacity of between approximately 1 l and approximately 30 l, in particular between approximately 2 l and approximately 20 l, which is provided with suitable thermal insulation which comprises, for example, vacuum insulation provided in a double wall 15 and optionally in addition thermal insulation with suitable insulating material. Downstream of the heat accumulator 14, the first annular line 13 of the primary circuit, which annular line is equipped with a controllable and/or regulable primary pump 16, connects the lower region of the heat accumulator 14 to the upstream end of the first heat exchanger 12 in order to complete the primary circuit.

The device 10 furthermore has a secondary circuit of the heat accumulator fluid, which secondary circuit serves as the working circuit and is connected to the primary circuit exclusively via the heat accumulator 14 and is otherwise separated from said primary circuit. The secondary circuit comprises a second annular line 17 which leads from the upper region of the heat accumulator 14 into the expansion machine 11. Downstream of the expansion machine 11, the second annular line 17 leads into the upstream end of a condenser 18 which serves for condensing the heat accumulator fluid if the latter is in a (still) gaseous state downstream of the expansion machine. The second annular line 17 furthermore connects the downstream end of the condenser 18 to a buffer container 19 for the temporary storage as required of the liquid heat accumulator fluid condensed in the condenser 18. The second annular line 17, which is equipped with a controllable and/or regulable secondary pump 20, furthermore connects the lower region of the buffer container 19 to the upstream end of a second heat exchanger 21 which—like the first heat exchanger 12 arranged in the primary circuit—is heated by the exhaust gas flow or waste heat flow guided in the exhaust pipe 2 of the internal combustion engine 1 and is arranged, with regard to the exhaust pipe 2, downstream of the first heat exchanger 12 in order to be able to make use of the residual heat still available downstream of the first heat exchanger 12 as completely as possible. The first heat exchanger 12 and the second heat exchanger 21 can be accommodated, for example, in a common housing or in separate housings (in each case not shown) which are/is expediently provided with thermal insulation. From the downstream end of the second heat exchanger 21, the second annular line 17 finally leads again into the heat accumulator 14 in order to complete the secondary circuit.

As can furthermore be gathered from the drawing, the internal pressure of the heat accumulator 14 configured as a pressure container is firstly controllable or regulable by means of a pressure control and/or regulating valve 23, which is arranged in the second annular line 17 of the secondary circuit downstream of the heat accumulator and upstream of the expansion machine 11, in order—as explained in more detail further below—to keep the heat accumulator fluid stored in the heat accumulator 14 at least partially and preferably predominantly in the liquid state. For this purpose, the control and/or regulating circuit (not shown) assigned to the pressure control and/or regulating valve 23 can be connected in particular to a temperature measurement device (likewise not shown) of the heat accumulator 14. For this purpose, the same applies to the pressure-controllable and/or regulable secondary pump 20. As is furthermore apparent from the drawing, in the present case, the secondary circuit furthermore has a bypass line 17a which is equipped with a pressure control and/or regulating valve 24—designed, for example, in a manner corresponding to the valve 23, —which bypass line extends parallel to the actual second annular line 17 and bypasses the expansion machine 11 as required in order to connect the heat accumulator 11 directly to the condenser 18 via the second annular line 17 as required, with the expansion machine 11 being bypassed, when the pressure control and/or regulating valve 23 has been closed and the pressure control and/or regulating valve 24 has taken over the abovementioned pressure control or regulation of the heat accumulator 14. It should be pointed out in this connection that instead, for example, also only a single such pressure control and/or regulating valve can be provided upstream of the branch of the bypass line 17a from the second annular line 17, wherein then firstly the bypass line 17a and secondly that portion of the second annular line 17 which is arranged between said branch and the expansion machine 11 can each be equipped with a simple shut-off valve (not shown). Such a bypass line 17a for the bridging of the expansion machine 11 as required is appropriate in particular whenever the condenser 18, which can basically also be cooled, of course, with ambient air, is supplied with a cooling medium flow 25 of the internal combustion engine 1 such that the cooling medium can be heated as required in order in particular to shorten the hot running phases of the internal combustion engine 1.

In order to prevent superheating of individual components or of a plurality of components of the device 10 as a result of an excessive input of heat by the heat accumulator fluid, which is circulated in the primary and secondary circuit, during the operation, the exhaust pipe 2 guiding the waste heat flow, can be equipped, in particular downstream of the catalytic convertor 4 and upstream of the first heat exchanger 12 and second heat exchanger 21, with a branch 2a which is provided with a valve arrangement (not shown) and which bypasses the heat exchangers 12, 21, for example as required, and transfers the exhaust gas flow directly to the end silencer 5, with the heat exchangers 12, 21 being bypassed. The valve arrangement may involve, for example, a shut-off valve arranged firstly in the branch 2a and secondly in the exhaust pipe 2 downstream of the branch 2a and upstream of the first heat exchanger 12, a 3/2-way valve arranged in the opening of the branch 2a into the exhaust pipe 2, or the like.

Furthermore, in the event that, when there is a temporarily increased requirement for power, the option of a temporary increase in the power of the expansion machine 11 is intended to be provided, a burner, as indicated schematically by the reference sign 26, which is connected in particular to the fuel supply of the internal combustion engine 2 and can serve for the superheating of the gaseous heat accumulator medium extracted from the heat accumulator 14 via the second annular line 17, can be provided in the secondary circuit downstream of the heat accumulator 14 and upstream of the expansion machine 11. Alternatively, for this purpose, a third heat exchanger (not shown) which, for its part, can be connected to the waste heat flow of the internal combustion engine as required, can be provided on the corresponding portion of the second annular line 17 of the secondary circuit.

As can be gathered only in a highly schematized way in the drawing, the expansion machine 11 can be connected, in particular with the interconnection of a gearbox (not shown), to the drive train (likewise not shown) of the motor vehicle such that the mechanical energy produced from the waste heat of the internal combustion engine 1 by the expansion machine can be used directly for driving the motor vehicle, whether for boosting the internal combustion engine 1 or whether alternatively when the latter is at a standstill. In this case, a purely mechanical power $P_m$ is consequently additionally available. Alternatively or additionally, the expansion machine 11 can be connected to a power generator 27 which is arranged downstream of said expansion machine and can be connected in particular to the power supply (not shown) of the motor vehicle such that the mechanical energy obtained from the waste heat of the internal combustion engine 1 can be used for generating power in order, for example, to be able to feed the electrical consumers in a vehicle, such as the electrical system and the secondary components thereof, or in particular the traction engine of hybrid vehicles, or else to be able to supercharge the traction batteries thereof. In the latter case, an electric power $P_e$ is consequently (additionally) available.

As is finally furthermore revealed in the drawing, it can be provided, according to an advantageous development of the device 10, that a fourth heat exchanger 30 is provided which is capable of protecting the catalytic convertor 4 and the turbocharger 3, which is optionally arranged upstream thereof, against superheating, in particular (although not exclusively) in the case of advantageous thermal insulation of the entire exhaust pipe 2. The fourth heat exchanger 30 is arranged here upstream of the first heat exchanger 12 and second heat exchanger 21 and in particular directly downstream of the internal combustion engine 1, for example in the region of the exhaust manifold 31 thereof. Its power is expediently controllable and/or regulable, which can be ensured, for example, by the fact that it is configured in the manner of an evaporation cooler which can be supplied with the respectively required amount of cooling medium in order to prevent the exhaust gas temperature in the turbocharger 3 and/or in the catalytic convertor 4 from exceeding a predetermined maximum value. In the present case, use is likewise made of the heat accumulator fluid for the cooling medium, and therefore the heat extracted from the exhaust gas flow or waste heat flow by means of the fourth heat exchanger 30 can likewise be reused and supplied to the heat accumulator 14. This can take place in particular by means of a tertiary circuit which is shown in schematized form in the drawing by dashed lines and, in a manner corresponding to the primary circuit, has the exclusive function of transferring the heat extracted from the exhaust gas flow or waste heat flow to the heat accumulator 14. The tertiary circuit consequently comprises, for example, a third annular line 32 which firstly connects the downstream end of the fourth heat exchanger 30 to the heat accumulator 14 or—as is the case in the exemplary embodiment shown—leads into the first annular line 17 upstream of the heat accumulator 14, and which secondly connects the lower region of the heat accumulator 14 to the upstream end of the fourth heat exchanger 30 or—as is the case in the exemplary embodiment shown—leads out of the first annular line 17 downstream of the heat accumulator 14.

A preferred embodiment of a method according to the invention for recovering heat from the internal combustion engine of a motor vehicle and for converting the recovered heat into mechanical energy by means of an expansion machine, as can be carried out with the above-described device, is described below.

According to this method, the heat accumulator fluid firstly is circulated through the first annular line 13 in the primary circuit by means of the primary pump 16, wherein said heat accumulator fluid is heated in the first heat exchanger 12 by the waste heat of the exhaust gas flow or waste heat flow, which is guided in the exhaust pipe 2, of the internal combustion engine 1, is transferred into the heat accumulator 14 and is recirculated from there to the first heat exchanger 12. Furthermore, the heat accumulator fluid, as mentioned above, can be circulated as required through the third annular line 32 of the tertiary circuit in order to be heated by means of the fourth heat exchanger 30. Secondly, the heat accumulator fluid is circulated through the second annular line 17 in the secondary circuit serving as the working circuit, wherein said heat accumulator fluid is extracted in the vapor state from the heat accumulator 14 and supplied to the expansion machine 11, is condensed downstream of the expansion machine 11 by means of the condenser 18 and is transferred into the buffer container 19 where it can be temporarily stored, if required. Downstream of the buffer accumulator 19, the heat accumulator medium is supplied by means of the secondary pump 20 to the second heat accumulator 21 which is operated by the residual heat of the waste heat flow, which is guided in the exhaust pipe 2, of the internal combustion engine 1, in order to use the available residual heat of the exhaust gas as completely as possible. From the second heat exchanger 21, the heat accumulator fluid is finally recirculated into the heat accumulator 14.

As is apparent from the drawing, the heat accumulator fluid in the heat accumulator 14 is predominantly kept in the liquid state F, and therefore the predominant portion of the heat energy stored in the heat accumulator 14 is stored in the heat accumulator fluid present in the liquid state F in the heat accumulator 14, which takes place in particular by the heat accumulator 14 being kept firstly by means of the pressure control and/or pressure regulating valve 23 (or 24) arranged in the line 17 of the secondary circuit (or in the bypass line 17a thereof, if the expansion machine 11 is intended to be bypassed), and secondly by means of the secondary pump 20 of the secondary circuit, to a pressure at which the heat accumulator fluid, at the respective temperature prevailing in the heat accumulator 14 and expediently detected by a sensor, is in subcritical thermodynamic equilibrium in accordance with the saturated liquid curve (with regard to the liquid phase F) or the saturated vapor curve (with regard to the steam phase G, which is in equilibrium with the liquid phase F) in its temperature-entropy diagram. Consequently, above the liquid phase F of the heat accumulator fluid there is a steam or gas phase G thereof in the heat accumulator 14, which steam or gas phase can be fed to the expansion machine 11 via the second annular line 17. The overall quantity of the heat accumulator fluid guided in the primary circuit and in the secondary circuit and optionally in the tertiary circuit is furthermore selected in particular in such a manner that, at least in the case of a maximum possible degree of filling of the heat accumulator fluid in the heat accumulator 14 (the heat accumulator 14 is entirely "supercharged"), for example at least approximately 80%, preferably at least approximately 90%, of the internal volume available in the heat accumulator 14 is filled with heat accumulator fluid which is in the liquid state F.

An advantage of the heat accumulator 14 operating according to the invention in the manner of what is referred to as a Ruths accumulator consists in that, because of the high volumetric energy density of the heat accumulator fluid stored herein primarily in the liquid state F, at relatively low speeds and moderate accelerations of the motor vehicle, such as, for example, in town traffic, the required driving power can be provided entirely from the mechanical energy produced by means of the expansion machine 11, wherein said mechanical energy can of course also be used cumulatively for boosting or relieving the load on the internal combustion engine 1. This takes place by the extraction of the heat accumulator fluid from the heat accumulator 14 in the vapor state, such as, in particular, in the form of saturated steam, and feeding same into the expansion machine 11 via the second annular line 17. In this case, evaporation heat is extracted from the heat accumulator fluid stored in the liquid phase F in the heat accumulator 14 (and also from the boiler material), and therefore the temperature and the pressure in the interior of the heat accumulator 14 drop. The extraction of the heat accumulator fluid in the vapor state can take place in particular in a requirement-oriented fashion, for example variably within wide limits in terms of time and quantity, and therefore said extraction is very substantially independent of the available waste heat energy provision of the exhaust gas flow, which is guided in the exhaust pipe 2, of the internal combustion engine 1. During such extraction phases, in which the heat accumulator fluid is circulated in the secondary circuit via the second annular line 17, the internal combustion engine 1, for example, can be operated under idle running or else can be entirely switched off (what is referred to as the coasting mode of the motor vehicle). This makes it possible for the internal combustion engine 1 not to have to be operated, or at least rarely to have to be operated, in use-unfavourable part load ranges.

If the expansion machine 11 is no longer (completely) capable of providing the required driving power (the expansion machine power and/or the heat energy stored in the heat accumulator 14 is exhausted), a further extraction of steam from the heat accumulator 14 via the second annular line 17 of the secondary circuit can be suppressed by the pressure control and/or regulating valve 23 (and of course also the pressure control and/or regulating valve 24 of the bypass line 17a) being closed, and the internal combustion engine 1, if (still) at a standstill, is switched on in order by means of its waste heat flow to supply heat energy to the heat accumulator 14 via the first annular line 13 of the primary circuit—and optionally via the second annular line 17 of the secondary circuit, if the buffer accumulator 19 contains heat accumulator fluid and there is sufficient exhaust gas heat.

For this purpose, the heat accumulator medium is always circulated by means of the primary pump 16 via the first annular line 13 in the circuit between the first heat exchanger 12 and the heat accumulator 14. In this case, the first heat exchanger 12 can act in the manner of a "flow heater", but also in the manner of a partial or complete evaporator of the heat accumulator fluid depending on the quantity of heat accumulator fluid circulated in the primary circuit and in the heat available in the waste heat flow. The heat energy absorbed here in the heat accumulator fluid, on its entry into the heat accumulator 14, increases the internal energy of the heat accumulator fluid, which is stored in the heat accumulator 14 predominantly in the liquid phase F, as a result of mixing and condensing a possible steam portion. By this means, the pressure and the temperature in the heat accumulator 14 increase. Furthermore, the remaining residual heat can be extracted from the exhaust gas flow or waste heat flow of the internal combustion engine 1 by the heat accumulator fluid located in the buffer accumulator 19 of the secondary circuit being transferred to the second heat exchanger 21 by means of the secondary pump via the second annular line 17 of the secondary circuit and, after passing through said heat exchanger, likewise being added to the heat accumulator 14 such that the exhaust gas flow is capable of being cooled virtually to condensate temperature.

Consequently, the greatest possible quantity of heat energy can be extracted from the exhaust gas flow or waste heat flow for the purpose of recycling. Such a supply of heat accumulator fluid from the second heat exchanger 21 of the secondary circuit into the heat accumulator 14 also increases both the quantity of heat accumulator fluid kept for storage there and also the stored quantity of heat. The "supercharging" of the heat accumulator 14 can take place, for example, until a previously determined maximum temperature and/or a maximum filling level of heat accumulator fluid which is in the liquid phase F has been reached. Then, for example by opening of the valve 23 (or 24), the extraction of steam from the heat accumulator is enabled via the second annular line 17 of the working or secondary circuit in order to drive the expansion machine 11 (or in order to enable the cooling medium circuit 25 of the motor vehicle by direct transfer of the heat accumulator fluid in vapor form to the condenser 18 by bypassing the expansion machine 11 via the bypass line 17a). The "charging" of the heat accumulator 14 and the "discharging" thereof can take place, for example, substantially in the manner of a hysteresis.

If the internal combustion engine 1 is in operation and the desired driving power of the motor vehicle is higher than the maximum power of the expansion machine 11, the latter can be used for boosting the internal combustion engine 1 by the mechanical power $P_m$ produced by said expansion machine being output to the drive train of the motor vehicle. In such a state, in particular only as much heat accumulator fluid in vapor form is extracted from the heat accumulator 14 via the second annular line 17 of the secondary circuit (the valve 24 of the bypass line 17a is closed) and supplied to the expansion machine 11 as can be regenerated from the waste heat flow by the first heat exchanger 12 of the primary circuit, optionally in conjunction with the second heat exchanger 21 of the secondary circuit, and fed into the heat accumulator 14. By this means, the pressure and the temperature of the heat accumulator fluid kept for storage in the heat accumulator 14 remain substantially constant. Consequently, the internal combustion engine 1, during such a manner of operation, for example during a journey on a motorway, can be boosted by the expansion machine 11 and can consequently be relieved of load in order to reduce the fuel consumption. On the other hand, the mechanical power $P_m$ produced by the expansion machine 11 can be super proportionately output, within the scope of the available power of the condenser 18, to the drive train of the motor vehicle such that the expansion machine 11 acts in the manner of a "booster" in order to provide a maximum driving power during a temporarily limited period of time, for example because of an overtaking operation.

As indicated above, on the basis of the embodiment according to the invention, a broad decoupling in terms of time of a supply of heat to the heat accumulator 14 from a removal of heat from the heat accumulator 14 for driving the expansion machine 11 can be ensured. In this connection, the following operating modes are conceivable, for example:

1. If the expansion machine 11 outputs its produced mechanical power $P_m$ to the drive train of the motor vehicle, said power is capable of ensuring the driving of the motor vehicle by itself while the internal combustion engine 1 is decoupled from the drive train and can either be in the idling mode, in order, for example, to drive the required secondary units of the motor vehicle, or the internal combustion engine 1 can be entirely shut down, wherein a potential power requirement of possible secondary units of the motor vehicle is covered electrically by electrification of said components.

2. If the power requirement required for driving the motor vehicle exceeds the power capability of the expansion machine 11 and the charging state of the heat accumulator 14 requires or permits discharging of the latter, the expansion machine 11 is supplied via the second annular line 17 of the secondary circuit (the valve 24 of the bypass line 17a is closed) via the valve 23 with a corresponding flow of heat accumulator fluid in vapor form in order to boost the internal combustion engine 1 with the produced mechanical power $P_m$. In this case, the charging state of the heat accumulator 14 is reduced; pressure and temperature of the heat accumulator fluid kept for storage therein drop. By means of such a reduction in load on the internal combustion engine 1, a reduction in the fuel consumption is achieved even if the effective efficiency of the internal combustion engine 1 itself will deteriorate as a consequence of the reduction in load.

3. If, during the operation of the internal combustion engine 1, in particular approximately under full load, there is an additional temporary requirement for power in the manner of a "boosting power", the internal combustion engine 1 can be temporarily boosted by mechanical power $P_m$ produced by the expansion machine 11, and therefore the available overall power exceeds the—only—maximum power of the internal combustion engine 1. However, in each case, care should be taken to ensure that the heat extracted from the heat accumulator fluid in the secondary circuit by means of the condenser 18 can be removed to a sufficient extent and the maximum possible condenser cooling power is not exceeded.

As already mentioned above, on the basis of the embodiment according to the invention, it is furthermore possible to ensure a reduction in the hot running phases of the internal combustion engine 1, which reduction is desirable both for economical and for ecological reasons, by the cooling medium flow 25 of the internal combustion engine 1 being preheated by means of the condenser 18 arranged in the secondary circuit, whether by bypassing the expansion machine 11 via the bypass line 17a (the valve 23 is closed; the valve 24 is open) or whether by using the (residual) heat, which is still present in the heat accumulator fluid downstream of the expansion machine 11, in the condenser 18 (the valve 24 is closed; the valve 23 is open). It should be emphasized in this connection that, for example during a starting of a vehicle with an operationally hot engine (the cooling medium temperature is approximately 90° C.), a reduction in the fuel consumption by approximately 5% is achieved in comparison to a starting temperature of 20° C. (FVV Vorhaben No. 1007 "Restwärmenutzung durch intelligente Speicher- und Verteilungssysteme (Literaturstudie) [Residual Heat Use by Intelligent Accumulator and Distribution Systems (Literature Review)]", final report). At lower starting temperatures, the fuel saving potential increases significantly. For the purpose of such preheating of the cooling medium circuit 25 of the internal combustion engine 1, the cooling medium circuit 25 of the motor vehicle is circulated by means of its cooling medium pump such that it flows through the condenser 18. The heat accumulator fluid is extracted in the vapor state G from the heat accumulator 14 via the second annular line 17 of the secondary circuit and supplied to the condenser 18, wherein said heat accumulator fluid is preferably guided past the expansion machine 11 by means of the bypass line 17a and throttled to condensation pressure by means of the pressure control and/or regulating valve 24. In the condenser 18, the condensation enthalpy of the heat accumulator fluid is output to the circulated cooling medium flow 25, as a result of which the latter is heated and consequently the hot running phase of the internal combustion engine 1 is shortened. This operating mode is maintained until the internal combustion engine 1 reaches its operating temperature and/or the heat accumulator 14 is energetically exhausted. Furthermore, it is conceivable to integrate the oil circuit of the motor vehicle into such preheating by said oil circuit being supplied to the condenser 18 likewise in a separate circulation line (not illustrated graphically). Furthermore, for example, the passenger compartment of the motor vehicle can also be preheated in an analogous manner.

If the motor vehicle has a hybrid drive with an electric motor (not reproduced graphically) arranged next to the internal combustion engine 1, for example in the form of a parallel or serial hybrid or a mixed hybrid, the mechanical power produced by the expansion machine 11 can be partially or entirely output to the power generator 27 which converts said mechanical power into electrical power $P_e$ in order to make it useable in particular for the electric motor of the hybrid drive. The electric motor can be fed directly here with the electrical power $P_e$ produced by the power generator 27, or said electrical power is stored in a traction battery pack of the electric motor. All of the abovementioned operating modes are also conceivable to this extent, wherein, for example, the following advantageous aspects emerge:
- the motor vehicle can be driven purely electrically for relatively long periods of time;
- because of the electrical energy additionally generated from the waste heat flow of the internal combustion engine 1 by means of the power generator 27, the overall efficiency can be improved and the traction battery pack can be configured to be smaller and accordingly more cost-effective and lighter;
- the traction battery pack can also be supercharged during operating phases in which waste heat of the internal combustion engine 1 is not (sufficiently) available, by extraction of heat accumulator fluid in vapor form from the heat accumulator 14 via the second annular line 17 of the secondary circuit and driving of the expansion machine 11 and of the power generator 27 arranged downstream thereof, if an additional increase in the electrical range is specifically desired (the heat accumulator 14 consequently serves as a type of "buffer accumulator" of the traction battery pack);
- the traction battery pack can be preheated in a corresponding manner as the cooling medium circuit 25 of the internal combustion engine 1, if said traction battery pack is equipped with a temperature control medium circuit which, for its part, is connected to the condenser 18.

We claim:

1. A method for recovering heat from a combustion engine and for converting the recovered heat into mechanical energy, the method comprising the steps of:
   a) guiding, using at least one primary pump, a heat accumulator fluid in a primary circuit in which the heat accumulator fluid is heated with waste heat of the combustion engine using at least one first heat exchanger, transferred into a heat accumulator and recirculated to the at least one first heat exchanger; and
   b) guiding the heat accumulator fluid in a secondary circuit in which the heat accumulator fluid is extracted in a vapor state from the heat accumulator, supplied to an expansion machine, condensed by means of a condenser disposed downstream of the expansion machine and recirculated into the heat accumulator using at least one secondary pump, wherein the primary circuit of the heat accumulator fluid is connected to the secondary circuit exclusively via the heat accumulator and is otherwise separated from the secondary circuit.

2. The method of claim 1, wherein the heat accumulator fluid in the heat accumulator is kept in a substantially liquid state, wherein a portion of heat stored in the heat accumulator is thereby stored in the heat accumulator fluid present in the liquid state in the heat accumulator.

3. The method of claim 2, wherein the heat accumulator fluid is kept in the substantially liquid state in the heat accumulator by means of at least one pressure control and/or regulating valve disposed in the secondary circuit downstream of the heat accumulator, by means of the secondary pump, with that secondary pump being pressure-controllable and/or regulable, and/or by means of a pressure control and/or regulation of the expansion machine which controls and/or regulates a pressure decrease in the heat accumulator fluid passing therethrough to a pressure at which the predominant portion of the heat accumulator fluid located in the heat accumulator is present in the liquid state.

4. The method of claim 2, wherein, at a respective temperature prevailing in the heat accumulator, the heat accumulator fluid in the heat accumulator is substantially kept in subcritical thermodynamic equilibrium between a liquid state and a vapor state.

5. The method of claim 1, wherein the expansion machine is exclusively fed from the heat accumulator with the heat accumulator fluid in a vapor state.

6. The method of claim 1, wherein the heat accumulator fluid in the secondary circuit downstream of the condenser is heated by the waste heat of the combustion engine using at least one second heat exchanger before said heat accumulator fluid is recirculated into the heat accumulator.

7. The method of claim 6, wherein the at least one first heat exchanger and/or the at least one second heat exchanger are bypassed from waste or residual heat of the combustion engine when the heat accumulator, at a maximum temperature, has reached a maximum pressure, when the heat accumulator has reached a maximum filling quantity with the heat accumulator fluid and/or when the heat accumulator fluid circulated in the secondary circuit can no longer be condensed in the condenser as a result of heat removed therein.

8. The method of claim 6, wherein the second heat exchanger is operated by residual heat of the combustion engine after waste heat thereof has been supplied by means of the at least one first heat exchanger to the heat accumulator fluid guided in the primary circuit.

9. The method of claim 1, wherein, in order to condense the heat accumulator fluid in the secondary circuit, the condenser is supplied with at least one of ambient air, a cooling medium of the combustion engine or another cooling medium circuit of a motor vehicle.

10. The method of claim 9, wherein, for heating of the cooling medium, the heat accumulator fluid in the secondary circuit is supplied directly to the condenser past the expansion machine via a bypass line.

11. The method of claim 1, wherein condensed heat accumulator fluid in the secondary circuit downstream of the condenser is temporarily stored in a buffer container from which the heat accumulator fluid is recirculated into the heat accumulator by the secondary pump.

12. The method of claim 1, wherein the heat accumulator fluid fed in the vapor state from the heat accumulator into the secondary circuit is superheated upstream of the expansion machine or is superheated upstream of the expansion machine using a burner.

13. The method of claim 12, wherein the first heat exchanger, the second heat exchanger and/or the third heat exchanger are fed by an exhaust gas flow from the combustion engine.

14. The method of claim 1, wherein a quantity of heat accumulator fluid circulated in the primary circuit and in the secondary circuit is selected in such a manner that, at a maximum possible filling level of the heat accumulator fluid in the heat accumulator, at least 50%, at least 70% or at least 90%, of a volume available in the heat accumulator is filled with the heat accumulator fluid in a liquid state.

15. The method of claim 1, wherein mechanical energy is obtained by means of the expansion machine.

16. A device for recovering heat from a combustion engine and for converting recovered heat into mechanical energy, the device comprising:
 a primary circuit having at least one primary pump, at least one first heat exchanger, a heat accumulator and a first annular line connecting said first heat exchanger to said heat accumulator, wherein said primary circuit is disposed, structured and dimensioned to guide, using said at least one primary pump, a heat accumulator fluid in said primary circuit, the heat accumulator fluid thereby being heated with waste heat of the combustion engine using said at least one first heat exchanger, transferred into said heat accumulator and recirculated to said at least one first heat exchanger; and
 a secondary circuit having an expansion machine, a condenser, disposed downstream of said expansion machine, a second annular line and at least one secondary pump, wherein said secondary circuit is disposed, structured and dimensioned to guide the heat accumulator fluid in said secondary circuit, to extract the heat accumulator fluid in a vapor state from said heat accumulator, to supply the heat accumulator fluid in the vapor state to said expansion machine, to condense the heat accumulator fluid in the vapor state by means of said condenser and to recirculate the heat accumulator fluid into the heat accumulator using said at least one secondary pump, wherein said primary circuit is connected to said secondary circuit exclusively via said heat accumulator and is otherwise separated from said secondary circuit.

17. The device of claim 16, wherein said heat accumulator is designed as a pressure container having an internal pressure which is controlled and/or regulated by at least one pressure control and/or regulating valve disposed in said secondary circuit downstream of said heat accumulator, by a pressure-controllable and/or regulable secondary pump arranged in said secondary circuit and/or
 by a pressure control and/or regulation of said expansion machine, which controls and/or regulates a pressure decrease in said heat accumulator fluid passing through said expansion machine.

18. The device of claim 16, wherein said expansion machine in said secondary circuit is exclusively connected to said heat accumulator by means of said second annular line.

19. The device of claim 16, wherein said secondary circuit comprises at least one second heat exchanger which is heated by waste heat from the combustion engine and which is disposed downstream of said condenser, wherein said at least one second heat exchanger is disposed in a residual heat flow of the combustion engine downstream of said at least one first heat exchanger.

20. The device of claim 19, wherein waste heat flow or residual heat flow of the combustion engine is separated from said at least one first heat exchanger and/or from said at least one second heat exchanger using a branch, thereby bypassing said first heat exchanger and/or said second heat exchanger.

21. The device of claim 16, wherein said condenser is supplied with at least one of ambient air, a cooling medium from the combustion engine or another cooling medium circuit of a motor vehicle.

22. The device of claim 16, wherein said secondary circuit has a bypass line which is equipped with at least one of a shut-off valve, a pressure control valve and/or a regulating valve, wherein said bypass line bypasses said expansion machine to directly connect said heat accumulator to said condenser.

23. The device of claim 16, wherein said secondary circuit has a buffer container, disposed downstream of said condenser, for the heat accumulator fluid.

24. The device of claim 16, wherein said first heat exchanger and/or said second heat exchanger are fed by an exhaust gas flow from the combustion engine.

25. The device of claim 16, wherein said heat accumulator has thermal insulation and/or a multi-layered wall having an intermediate space in which negative pressure or vacuum prevails or in which an aerogel or a thermochemical storage medium is accommodated.

* * * * *